US012812426B2

(12) United States Patent
Kimba Dit Adamou et al.

(10) Patent No.: US 12,812,426 B2
(45) Date of Patent: Nov. 24, 2026

(54) MINIMIZATION OF DRIVE-TEST MEASUREMENT METHOD AND DEVICE

(71) Applicant: VIVO MOBILE COMMUNICATION CO., LTD., Chang'an Dongguan (CN)

(72) Inventors: Boubacar Kimba Dit Adamou, Chang'an Dongguan (CN); Xiaodong Yang, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 321 days.

(21) Appl. No.: 17/378,179

(22) Filed: Jul. 16, 2021

(65) Prior Publication Data

US 2021/0345152 A1 Nov. 4, 2021

Related U.S. Application Data

(63) Continuation of application No. PCT/CN2020/072695, filed on Jan. 17, 2020.

(30) Foreign Application Priority Data

Jan. 18, 2019 (CN) ......................... 201910106033.7

(51) Int. Cl.

*H04W 24/10* (2009.01)
*H04W 24/02* (2009.01)
*H04W 24/08* (2009.01)

(52) U.S. Cl.

CPC ........... *H04W 24/10* (2013.01); *H04W 24/02* (2013.01); *H04W 24/08* (2013.01)

(58) Field of Classification Search

CPC ..... H04W 24/10; H04W 24/02; H04W 24/08; H04W 8/183; H04W 88/06

USPC ........................................................ 370/329

See application file for complete search history.

(56) References Cited

U.S. PATENT DOCUMENTS

2012/0295650 A1 11/2012 Futaki et al.
2013/0070632 A1 3/2013 Jung
2015/0289156 A1 10/2015 Jung et al.
2016/0353308 A1 12/2016 Kim et al.
2017/0208491 A1* 7/2017 Xu ........................ H04W 24/10
2021/0099895 A1 4/2021 Hong (Continued)

FOREIGN PATENT DOCUMENTS

CN 102685793 A * 9/2012
CN 102752787 A 10/2012
CN 102948201 A 2/2013

(Continued)

OTHER PUBLICATIONS

Extended European search report related to Application No. 20742102.5 reported on Feb. 21, 2022.

(Continued)

*Primary Examiner* — Nicholas A Jensen
*Assistant Examiner* — Oladiran Gideon Olaleye

(57) ABSTRACT

Embodiments of the present disclosure provide a minimization of drive-test (MDT) measurement method and a device. The method includes: receiving configuration information of MDT for a user equipment (UE 1); and performing MDT measurement based on the configuration information, and recording a first measurement result measured for the first network and a second measurement result measured for the second network.

20 Claims, 3 Drawing Sheets

(56) References Cited

U.S. PATENT DOCUMENTS

| | | | | |
|---|---|---|---|---|
| 2022/0272560 | A1* | 8/2022 | Hong | H04W 24/10 |
| 2026/0012835 | A1* | 1/2026 | Kimba Dit Adamou | H04W 24/02 |

FOREIGN PATENT DOCUMENTS

| | | | | |
|---|---|---|---|---|
| CN | 103582001 | A | 2/2014 | |
| CN | 105900475 | A | 8/2016 | |
| CN | 106105299 | A | 11/2016 | |
| CN | 106576264 | A | 4/2017 | |
| CN | 108401510 | A | 8/2018 | |
| GB | 2556027 | A | 5/2018 | |
| KR | 20170007529 | A | 1/2017 | |
| KR | 20170046815 | A | 5/2017 | |
| WO | 2012039722 | A1 | 3/2012 | |
| WO | WO-2012152108 | A1 * | 11/2012 | H04W 24/10 |
| WO | 2014175882 | A1 | 10/2014 | |
| WO | WO-2015031171 | A1 * | 3/2015 | H04W 24/10 |
| WO | WO-2016012053 | A1 * | 1/2016 | H04W 24/08 |
| WO | WO-2018085702 | A1 * | 5/2018 | |
| WO | WO-2018142347 | A1 * | 8/2018 | H04W 24/10 |
| WO | WO-2018143875 | A1 * | 8/2018 | H04W 76/19 |

OTHER PUBLICATIONS

International Search Report & Written Opinion related to Application No. PCT/CN2020/072695; reported on Jul. 29, 2021.

First Chinese Office Action for related Application No. 201910106033.7; reported on Mar. 10, 2021.

South Korean Request for the Submission of an Opinion for related Application No. 10-2021-7025612; reported on Jul. 27, 2023.

Nokia, Alcatel-Lucent Shanghai Bell, “SS block RSRP measurements”, May 15-19, 2017, 3GPP TSG RAN WG1#89, Hangzhou, P.R. China, R1-1708237.

* cited by examiner

MINIMIZATION OF DRIVE-TEST MEASUREMENT METHOD AND DEVICE

CROSS-REFERENCE TO RELATED APPLICATION

The present application is a continuation application of International Application No. PCT/CN2020/072695 filed on Jan. 17, 2020, which claims priority of Chinese Patent Application No. 201910106033.7 filed in china on Jan. 18, 2019, both of which are incorporated herein by reference in their entireties.

TECHNICAL FIELD

Embodiments of the present disclosure relate to the field of communications technologies, and specifically, to a measurement method and a device.

BACKGROUND

Technical studies on minimization of drive-test (MDT) are proposed for Long Term Evolution (LTE) networks of the 4th generation mobile communication technology (4G). MDT refers to a technology that is used by a communications system to automatically collect and analyze terminal measurement reports containing location information, and is used to reduce the workload of manual drive tests to the greatest extent.

When a dual-card terminal needs to perform MDT recording, two cells with which the dual-card terminal is registered need to perform MDT configuration twice for the dual-card terminal, resulting in a waste of resources.

SUMMARY

According to a first aspect of the embodiments of the present disclosure, a measurement method is provided, applied to a communications device, where the communications device includes at least two pieces of user equipment (UE), the at least two UEs include UE 1 and UE 2, and the method includes:

receiving configuration information of minimization of drive-test (MDT) for the UE 1; and performing MDT measurement based on the configuration information, and recording a first measurement result measured for the UE 1 and a second measurement result measured for the UE 2.

According to a second aspect of the embodiments of the present disclosure, a communications device is further provided, where the communications device includes at least two UEs, the at least two UEs include UE 1 and UE 2, and the communications device further includes:

a receiving module, configured to receive configuration information of minimization of drive-test (MDT) for the UE 1; and a measurement record module, configured to perform MDT measurement based on the configuration information, and record a first measurement result measured for the UE 1 and a second measurement result measured for the UE 2.

According to a third aspect of the embodiments of the present disclosure, a communications device is further provided, including: a processor, a memory, and a program stored in the memory and executable on the processor. When the program is executed by the processor, the steps of the measurement method according to the first aspect are implemented.

According to a fourth aspect of the embodiments of the present disclosure, a computer-readable storage medium is further provided. The computer-readable storage medium stores a computer program. When the computer program is executed by a processor, the steps of the measurement method according to the first aspect are implemented.

BRIEF DESCRIPTION OF DRAWINGS

It becomes clear for a person of ordinary skill in the art to learn various other advantages and benefits by reading detailed description of the following optional implementations. Accompanying drawings are merely used for showing the optional implementations, and are not considered as a limitation on the present disclosure. In all accompanying drawings, a same reference symbol is used to indicate a same part. In the accompanying drawings.

DESCRIPTION OF EMBODIMENTS

Figure 1:
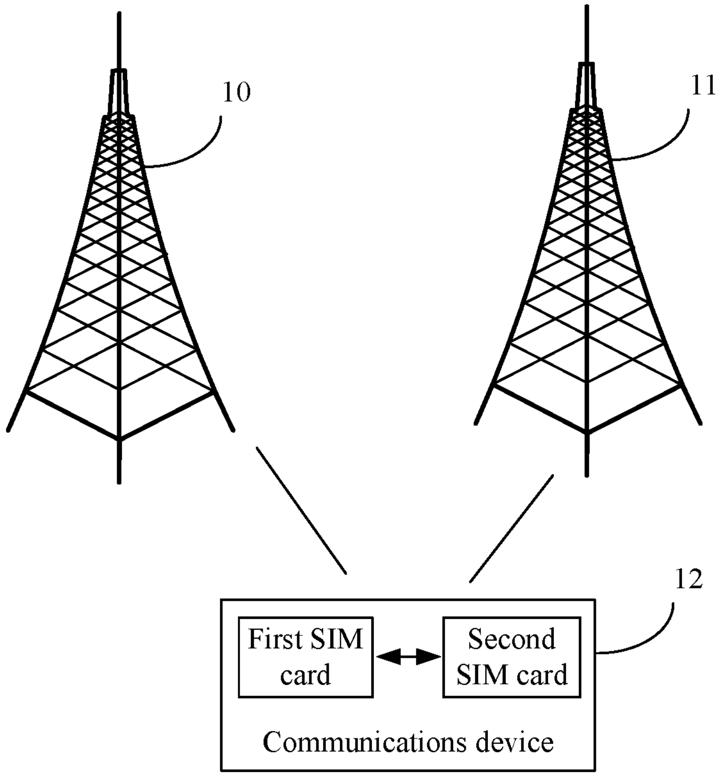
FIG. 1 is a schematic architectural diagram of a wireless communications system according to an embodiment of the present disclosure.

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of this disclosure without creative efforts shall fall within the protection scope of this disclosure.

The term "include" and any other variants in the specification and claims of this application mean to cover the non-exclusive inclusion, for example, a process, method, system, product, or device that includes a list of steps or units is not necessarily limited to those steps or units, but may include other steps or units not expressly listed or inherent to such a process, method, product, or device. In addition, "and/or" used in the specification and claims means at least one of the connected objects. For example, A and/or B represents the following three cases: Only A exists, only B exists, and both A and B exist.

In the embodiments of the present disclosure, the word such as "exemplary" or "example" is used to represent giving an example, an illustration, or a description. Any embodiment or design scheme described as "exemplary" or "for example" in the embodiments of this disclosure should not be construed as being more preferred or advantageous than other embodiments or design schemes. To be precise, the use of the term such as "exemplary" or "for example" is intended to present a related concept in a specific manner.

The technology described in this specification is not limited to the 5th-generation (5G) system and subsequent evolved communication systems as well as LTE/LTE-advanced (LTE-A) systems, and can also be applied to various wireless communication systems such as code division multiple access (CDMA), time division multiple access (TDMA), frequency division multiple access (FDMA), orthogonal frequency division multiple access (OFDMA), and single-carrier frequency-division multiple access (SC-FDMA) systems, and other systems.

The terms "system" and "network" are usually used interchangeably. A CDMA system may implement a radio technology such as CDMA2000 or universal terrestrial radio access (UTRA). UTRA includes Wideband CDMA (WCDMA) and other CDMA variants. A TDMA system can implement radio technologies such as the global system for mobile communications (GSM). An OFDMA system may implement a radio technology such as Ultra Mobile Broadband (UMB), evolved UTRA (E-UTRA), IEEE 802.11 (Wi-Fi), IEEE 802.16 (WiMAX), IEEE 802.20, or Flash-OFDM. UTRA and E-UTRA are a part of Universal Mobile Telecommunications System (UMTS). LTE and more advanced LTE (such as LTE-A) are new UMTS versions that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The technology described in the present disclosure may also be used in the foregoing system and radio technology, and may also be used in another system and radio technology.

For ease of understanding the embodiments of the present disclosure, the following technical points are described:

1. MDT (1) MDT Mode

MDT measurement includes two modes: logged MDT and immediate MDT.

(2) Terminal Measurement Configuration

It may be independent of the network for recording target configuration MDT for a terminal, and is a configuration for measuring normal radio resource management (RRM). However, in most cases, the availability of measurement results depends conditionally on the terminal RRM configuration.

(3) Terminal Measurement Collection and Reporting

MDT measurement records include multiple events and measurements over time. Time interval measurement collection and reporting are decoupled to limit the impact on terminal battery consumption and network signaling load.

(4) Geographical Range of Measurement Records

The geographic area of defined measurement sets can be collected or configured.

(5) Location Information

Measurement should be associated with available location information and/or other information or measured values, which can be used to derive location information.

(6) Time Information

A measured value in a measurement record should be associated with a time stamp.

(7) Terminal Capability Information

A network can use the terminal capability to select a terminal for MDT measurement.

2. MDT Process in the Related Art (1) Logged MDT (Logged MDT)

When a terminal is in an idle (idle) state, the terminal performs MDT measurement according to configuration information of MDT delivered by a network and saves recorded content. When the terminal enters a connected state, it notifies the network that there is MDT data and reports the MDT data to a base station.

(2) Immediate MDT (Immediate MDT)

The terminal performs MDT measurement in the connected state and immediately reports MDT data to the base station.

After receiving the MDT data reported by the terminal, the base station can feed it back to the operation administration and maintenance (OAM) node or other nodes that collect the MDT data.

The embodiments of the present disclosure are described below with reference to the accompanying drawings. A measurement method and a device provided in the embodiments of the present disclosure can be applied to a wireless communications system. FIG. 1 is a schematic architectural diagram of a wireless communications system according to an embodiment of the present disclosure. As shown in FIG. 1, the wireless communications system may include a network device 10, a network device 11, and a communications device 12. The communications device 12 may be recorded as UE, and can communicate with (transmit signaling or data to) the network device 10 and the network device 11. In actual application, a connection between the devices is a wireless connection. For ease of visually indicating a connection relationship between the devices, a solid line is used for illustration in FIG. 1.

The network device 10 and the network device 11 provided in the embodiments of the present disclosure may be base stations, and the base station may be a generally used base station, or may be an evolved node base station (eNB), or may be a device such as a network device (for example, a next generation node base station (gNB) or a transmission and reception point (TRP)) in a 5G system.

The communications device provided in this embodiment of the present disclosure may be a mobile phone, a tablet computer, a laptop computer, an ultra-mobile personal computer (UMPC), a netbook, or a personal digital assistant (PDA), a mobile Internet device (MID), a wearable device (Wearable Device), an in-vehicle device, or the like.

The communications device 12 may be a multi-card terminal. For example, the communications device 12 includes a first subscriber identity module (SIM) card and a second SIM card. The first SIM card and the second SIM card can share or exchange internal information (for example, configuration information) of the communications device 12. The communications device 12 can access a first network via the first SIM card and can access a second network via the second SIM card. The first network and the second network may be of different network types. For example, the first network is a 5G new radio (NR) network, and the second network is an LTE network.

It may be understood that the network types of the first network and the second network and the quantity of SIM cards in the communications device 12 are not limited in this embodiment of the present disclosure.

In this embodiment of the present disclosure, the SIM card may be a virtual SIM card, or may be a physical SIM card. It may be understood that the dimension of the SIM card is not limited in this embodiment of the present disclosure. The SIM card may be a standard-sized SIM card, a Micro-SIM card, or a Nano-SIM card.

Figure 2:
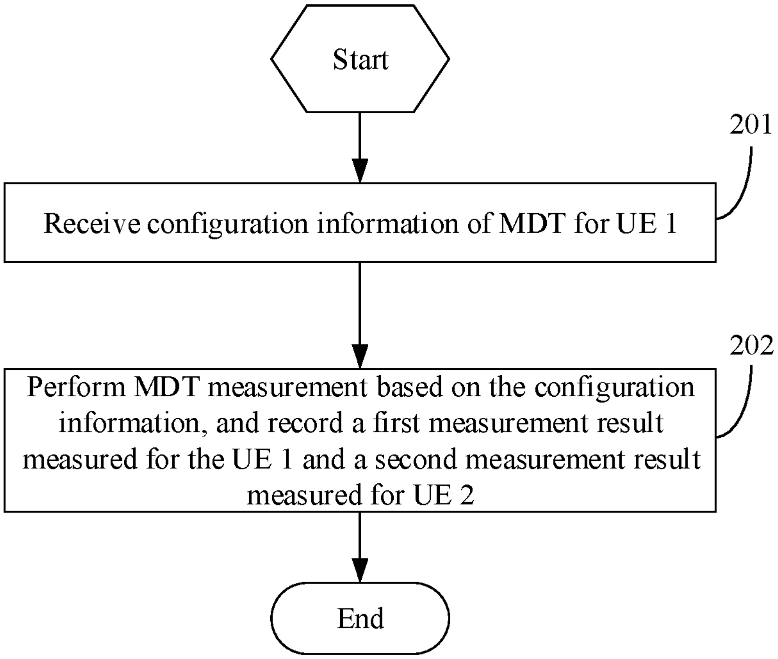
FIG. 2 is a flowchart of a measurement method according to an embodiment of the present disclosure.

Referring to FIG. 2, an embodiment of the present disclosure provides a measurement method. The method can be performed by a communications device, the communications device may include at least two user equipments (UEs), the at least two UEs include UE 1 and UE 2, and the method includes steps 201 and 202.

Step 201: Receive configuration information of MDT for the UE 1.

In this embodiment of the present disclosure, the communications device may be divided into at least two virtual user equipments including the UE 1 and the UE 2. The UE 1 and the UE 2 are not physical terminals. That is, the at least two virtual user equipments (the UE 1 and the UE 2) are integrated onto the communications device. The communications device can be understood as a multi-card terminal.

For example, the communications device is a dual-card terminal, and includes a SIM card 1 and a SIM card 2. The communications device registers with a cell 1 via the SIM card 1, and registers with a cell 2 via the SIM card 2. On the network side, for the cell 1, it is considered that the UE 1 is a communications device that accesses the cell 1, and for the cell 2, it is considered that the UE 2 is a communications device that accesses the cell 2.

Further, the cell 1 and the cell 2 may belong to different networks. For example, the cell 1 is an NR cell, and the cell 2 is an LTE cell.

Further, the UE 1 and the UE 2 can share or exchange internal information of the dual-card terminal. It may be understood that sharing or exchange of internal information of the dual-card terminal can be performed between the SIM card 1 and the SIM card 2. Sharing means that both the SIM card 1 and the SIM card 2 can obtain internal information (for example, configuration information of MDT) of the dual-card terminal from shared storage space. Exchange means that internal information (for example, configuration information of MDT) of the dual-card terminal can be transmitted between the SIM card 1 and the SIM card 2.

Optionally, the configuration information may include one or more of the following:

(1) a parameter for indicating a measurement area;

(2) to-be-recorded content of a measurement record; and (3) to-be-recorded information about an abnormal event.

It may be understood that, the timing length of a measurement timer may be configured based on a specific situation, and is not limited in this embodiment of the present disclosure.

Optionally, the parameter for indicating a measurement area may include one or more of the following:

(1) a network slice list (slice list);

(2) a radio access network (RAN) paging area;

(3) a RAN notification area;

(4) a RAN location area;

(5) a system message effective area (System information area); and (6) information about a network cell, for example, a physical cell identifier (PCI) of the cell.

Optionally, the to-be-recorded content of a measurement record may include one or more of the following:

(1) a reference signal received power (RSRP) value of a synchronization signal and PBCH block (SS block);

(2) a reference signal received quality (RSRQ) value of the SS block;

(3) a signal to interference plus noise ratio (SINR) value of the SS block;

(4) a measurement result of a primary synchronization signal (PSS) of the SS block;

(5) a measurement result of a secondary synchronization signal (SSS) of the SS block;

(6) a measurement result of a physical broadcast channel (PBCH) of the SS block;

(7) an RSRP value of a channel state information reference signal (CSI-RS);

(8) an RSRQ value of the CSI-RS;

(9) an SINR value of the CSI-RS;

(10) a measurement result of a tracking RS (TRS); and

(11) a measurement result of a phase-tracking RS (PTRS).

Further, optionally, the measurement result of the PSS or the measurement result of the SSS includes a beam time index.

Further, optionally, the measurement result of the PBCH includes one or more of the following: a measurement result of a demodulation reference signal (DMRS); and beam information related to the DMRS.

Optionally, the to-be-recorded information about an abnormal event may include one or more of the following:

(1) radio link failure (RLF) information;

(2) integrity protection failure (ICF) information; and (3) abnormal event occurrence (AEO) information.

Optionally, the AEO information may include one or more of the following:

(1) a type of the abnormal event;

(2) identification information about a cell in which the abnormal event occurs;

(3) information about a slice on which the abnormal event occurs;

(4) a RAN notification area in which the abnormal event occurs;

(5) a quantity of times the abnormal event occurs;

(6) time when the abnormal event occurs;

(7) duration of the abnormal event; and (8) information about a radio bearer on which the abnormal event occurs.

Step 202: Perform MDT measurement based on the configuration information, and record a first measurement result measured for the UE 1 and a second measurement result measured for the UE 2.

In this embodiment of the present disclosure, after the communications device receives the configuration information of MDT for the UE 1, the UE 1 and the UE 2 can share or exchange information (for example, the configuration information of MDT) of the communications device. In this way, the communications device can perform MDT measurement according to the configuration information of MDT, and record the first measurement result measured for the UE 1 and the second measurement result measured for the UE 2.

Further, the first measurement result or the second measurement result includes one or more of the following: content of a measurement record and information about an abnormal event.

It may be understood that storage-related parameters (such as storage quantity and storage time) in the first measurement result and the second measurement result may be configured based on a specific situation.

According to this embodiment of the present disclosure, for the communications device onto which the at least two UEs are integrated, only the configuration information of MDT for the UE 1 needs to be configured on the network side, and the UE 1 and the UE 2 in the communications device share or exchange the configuration information of MDT, so that the communications device can perform MDT measurement based on the configuration information, and record the first measurement result measured for the UE 1 and the second measurement result measured for the UE 2. In this way, the communications device can record the first measurement result measured for the UE 1 and the second measurement result measured for the UE 2 only by configuring configuration information of MDT once on the network side, which avoids the problem that two cells with which a dual-card terminal is registered need to perform MDT configuration twice for the dual-card terminal, thereby effectively reducing network signaling.

Figure 3:
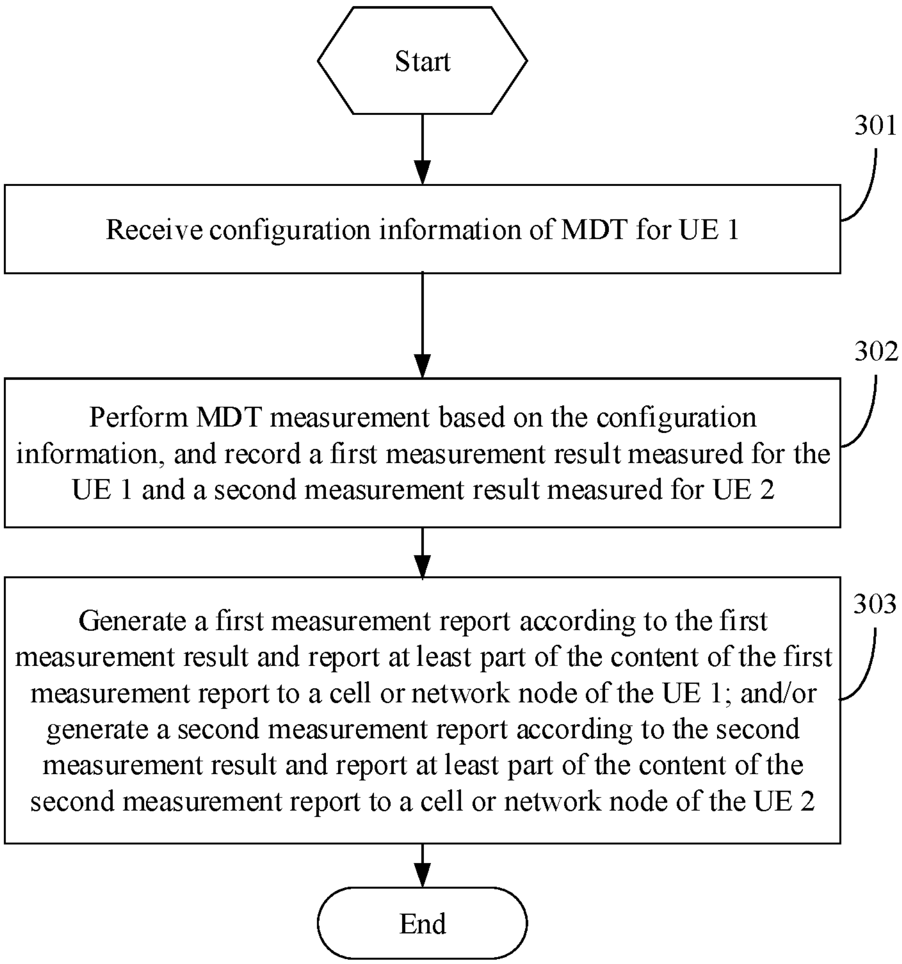
FIG. 3 is another flowchart of a measurement method according to an embodiment of the present disclosure.

Referring to FIG. 3, an embodiment of the present disclosure provides a measurement method. The method can be performed by a communications device, the communications device may include at least two user equipments (UEs), the at least two UEs include UE 1 and UE 2, and the method includes steps 301 to 303.

Step 301: Receive configuration information of MDT for the UE 1.

It may be understood that for descriptions of step 301, refer to the descriptions of step 201.

Step 302: Perform MDT measurement based on the configuration information, and record a first measurement result measured for the UE 1 and a second measurement result measured for the UE 2.

It may be understood that for descriptions of step 302, refer to the descriptions of step 202.

Step 303: Generate a first measurement report according to the first measurement result and report at least part of the content of the first measurement report to a cell or network node of the UE 1; and/or generate a second measurement report according to the second measurement result and report at least part of the content of the second measurement report to a cell or network node of the UE 2.

Further, the reporting at least part of the content of the first measurement report to a cell or network node of the UE 1 includes: when the UE 1 is in a connected state or an inactive (inactive) state, directly reporting at least part of the content of the first measurement report to the cell or network node of the UE 1.

Further, the reporting at least part of the content of the first measurement report to a cell or network node of the UE 1 includes: when the UE 1 is in a connected state or an inactive state, sending first information to the cell or network node of the UE 1, where the first information is used to indicate the first measurement report; receiving second information from the cell or network node of the UE 1, where the second information is used to instruct that at least part of the content of the first measurement report be reported; and sending at least part of the content of the first measurement report to the cell or network node of the UE 1 according to the second information.

Further, the reporting at least part of the content of the second measurement report to a cell or network node of the UE 2 includes: when the UE 2 is in a connected state or an inactive state, directly reporting at least part of the content of the second measurement report to the cell or network node of the UE 2.

Further, the reporting at least part of the content of the second measurement report to a cell or network node of the UE 2 includes: when the UE 2 is in a connected state or an inactive state, sending third information to the cell or network node of the UE 2, where the third information is used to indicate the second measurement report; receiving fourth information from the cell or network node of the UE 2, where the fourth information is used to instruct that at least part of the content of the second measurement report be reported; and sending at least part of the content of the second measurement report to the cell or network node of the UE 2.

In this embodiment of the present disclosure, the communications device may at least include a SIM card 1 and a SIM card 2. The communications device receives (or the communications device receives via the SIM card 1) configuration information of MDT from a first network. The first network is a network that the communications device accesses via the SIM card 1. Then, the communications device performs MDT measurement based on the configuration information, and records a first measurement result measured for the first network and a second measurement result measured for a second network. The second network is a network that the communications device accesses via the SIM card 2. The first network and the second network may be of different network types. For example, the first network is a 5G NR network, and the second network is an LTE network.

Further, the communications device reports (or the communications device reports via the SIM card 1) at least part of the content of the first measurement report to the first network, and/or the communications device reports (or the communications device reports via the SIM card 2) at least part of the content of the second measurement report to the second network.

Further, the communications device directly reports (or the communications device reports via the SIM card 1) at least part of the content of the first measurement report to the first network.

Further, the communications device sends (or the communications device sends via the SIM card 1) first information to the first network, where the first information is used to indicate the first measurement report; the communications device receives (or the communications device receives via the SIM card 1) second information from the first network, where the second information is used to instruct that at least part of the content of the first measurement report be reported; and the communications device sends (or the communications device sends via the SIM card 1) at least part of the content of the first measurement report to the first network.

Further, the communications device directly reports (or the communications device reports via the SIM card 2) at least part of the content of the second measurement report to the second network.

Further, the communications device sends (or the communications device sends via the SIM card 2) third information to the second network, where the third information is used to indicate the second measurement report; the communications device receives (or the communications device receives via the SIM card 2) fourth information from the second network, where the fourth information is used to instruct that at least part of the content of the second measurement report be reported; and the communications device sends (or the communications device sends via the SIM card 2) at least part of the content of the second measurement report to the second network.

According to this embodiment of the present disclosure, for the communications device onto which the at least two UEs are integrated, only the configuration information of MDT for the UE 1 needs to be configured on the network side, and the UE 1 and the UE 2 in the communications device share or exchange the configuration information of MDT, so that the communications device can perform MDT measurement based on the configuration information, record the first measurement result measured for the UE 1 and the second measurement result measured for the UE 2, and perform direct reporting or perform reporting as instructed by a network. In this way, the communications device can record the first measurement result measured for the UE 1 and the second measurement result measured for the UE 2 only by configuring configuration information of MDT once on the network side, which avoids the problem that two cells with which a dual-card terminal is registered need to perform MDT configuration twice for the dual-card terminal, thereby effectively reducing network signaling.

This embodiment of the present disclosure further provides a communications device. Because a problem-resolving principle of the communications device is similar to that of the measurement method in this embodiment of the present disclosure, for implementation of the communications device, reference may be made to implementation of the method, and repeated parts are not described.

Figure 4:
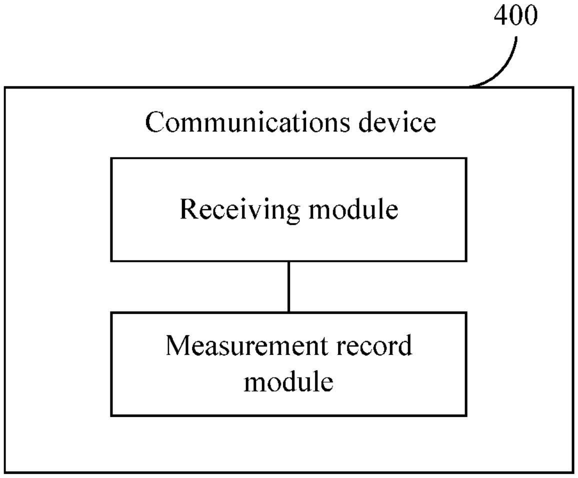
FIG. 4 is a schematic structural diagram of a communications device according to an embodiment of the present disclosure.

Referring to FIG. 4, an embodiment of the present disclosure further provides a communications device. The communications device includes at least two user equipments (UEs), the at least two UEs include UE 1 (not shown in the figure) and UE 2 (not shown in the figure), and the communications device 400 further includes:

a receiving module, configured to receive configuration information of minimization of drive-test (MDT) for the UE 1; and a measurement record module, configured to perform MDT measurement based on the configuration information, and record a first measurement result measured for the UE 1 and a second measurement result measured for the UE 2.

In this embodiment of the present disclosure, the communications device is divided into the UE 1 and the UE 2. The UE 1 and the UE 2 are virtual terminals, but not physical terminals. That is, the at least two virtual terminals are integrated onto the communications device. In this way, the communications device can be understood as a multi-card terminal.

For example, the communications device is a dual-card terminal, and includes a SIM card 1 and a SIM card 2. The communications device registers with a cell 1 via the SIM card 1, and registers with a cell 2 via the SIM card 2. On the network side, for the cell 1, it is considered that the UE 1 is a communications device that accesses the cell 1, and for the cell 2, it is considered that the UE 2 is a communications device that accesses the cell 2.

Further, the cell 1 and the cell 2 may belong to different networks. For example, the cell 1 is an NR cell, and the cell 2 is an LTE cell.

Further, the UE 1 and the UE 2 can share or exchange internal information of the dual-card terminal. It may be understood that sharing or exchange of internal information of the dual-card terminal can be performed between the SIM card 1 and the SIM card 2. Sharing means that both the SIM card 1 and the SIM card 2 can obtain internal information (for example, configuration information of MDT) of the dual-card terminal from shared storage space.

Exchange means that internal information (for example, configuration information of MDT) of the dual-card terminal can be transmitted between the SIM card 1 and the SIM card 2.

In this embodiment of the present disclosure, optionally, the communications device 400 further includes:

a reporting module, configured to: generate a first measurement report according to the first measurement result and report at least part of the content of the first measurement report to a cell or network node of the UE 1, and/or generate a second measurement report according to the second measurement result and report at least part of the content of the second measurement report to a cell or network node of the UE 2.

In this embodiment of the present disclosure, optionally, the reporting module is further configured to directly report at least part of the content of the first measurement report to the cell or network node of the UE 1.

In this embodiment of the present disclosure, optionally, the reporting module is further configured to: send first information to the cell or network node of the UE 1, where the first information is used to indicate the first measurement report; receive second information from the cell or network node of the UE 1, where the second information is used to instruct that at least part of the content of the first measurement report be reported; and send at least part of the content of the first measurement report to the cell or network node of the UE 1 according to the second information.

In this embodiment of the present disclosure, optionally, the reporting module is further configured to directly report at least part of the content of the second measurement report to the cell or network node of the UE 2.

In this embodiment of the present disclosure, optionally, the reporting module is further configured to: send third information to the cell or network node of the UE 2, where the third information is used to indicate the second measurement report; receive fourth information from the cell or network node of the UE 2, where the fourth information is used to instruct that at least part of the content of the second measurement report be reported; and send at least part of the content of the second measurement report to the cell or network node of the UE 2 according to the fourth information.

In this embodiment of the present disclosure, optionally, the configuration information includes one or more of the following:

a parameter for indicating a measurement area;
to-be-recorded content of a measurement record; and
to-be-recorded information about an abnormal event.

In this embodiment of the present disclosure, optionally, the parameter for indicating a measurement area includes one or more of the following:

a network slice list;
a RAN paging area;
a RAN notification area;
a RAN location area;
a system message effective area; and
information about a network cell.

In this embodiment of the present disclosure, optionally, the content of a measurement record includes one or more of the following:

an RSRP value of an SS block;
an RSRQ value of the SS block;
an SINR value of the SS block;
a measurement result of a PSS of the SS block;
a measurement result of an SSS of the SS block;
a measurement result of a PBCH of the SS block;
an RSRP value of a CSI-RS;
an RSRQ value of the CSI-RS;
an SINR value of the CSI-RS;
a measurement result of a TRS; and
a measurement result of a PTRS.

In this embodiment of the present disclosure, optionally, the measurement result of the PSS or the measurement result of the SSS includes a beam time index.

In this embodiment of the present disclosure, optionally, the measurement result of the PBCH includes one or more of the following:

a measurement result of a demodulation reference signal (DMRS); and
beam information related to the DMRS.

In this embodiment of the present disclosure, optionally, the information about an abnormal event includes one or more of the following:

RLF information;
ICF information; and
AEO information.

In this embodiment of the present disclosure, optionally, the AEO information includes one or more of the following:

a type of the abnormal event;

identification information about a cell in which the abnormal event occurs;

information about a slice on which the abnormal event occurs;

a RAN notification area in which the abnormal event occurs;

a quantity of times the abnormal event occurs;

time when the abnormal event occurs;

duration of the abnormal event; and information about a radio bearer on which the abnormal event occurs.

In this embodiment of the present disclosure, optionally, the first measurement result or the second measurement result includes one or more of the following: content of a measurement record and information about an abnormal event.

The communications device provided in this embodiment of the present disclosure can perform the foregoing method embodiments. An implementation principle and a technical effect of the communications device are similar to those of the method embodiments, and details are not described again in this embodiment.

Figure 5:
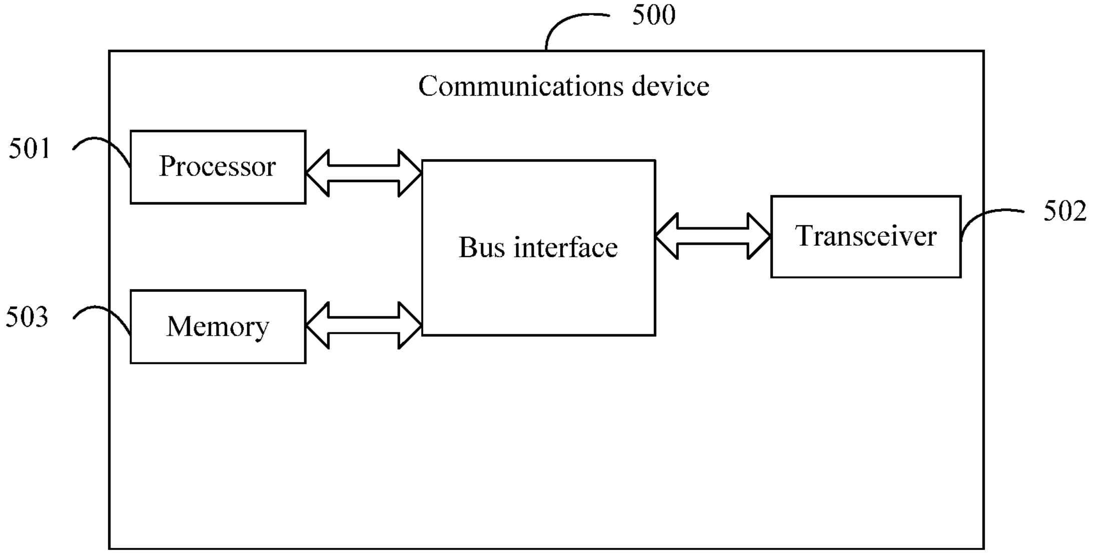
FIG. 5 is another schematic structural diagram of a communications device according to an embodiment of the present disclosure.

Referring to FIG. 5, FIG. 5 is a structural diagram of a communications device to which an embodiment of the present disclosure is applied. As shown in FIG. 5, the communications device 500 includes: a processor 501, a transceiver 502, a memory 503, and a bus interface.

In an embodiment of the present disclosure, the communications device 500 further includes a program that is stored in the memory 503 and that can run on the processor 501, and when the program is executed by the processor 501, the following steps are implemented: receiving configuration information of MDT for UE 1; and performing MDT measurement based on the configuration information, and recording a first measurement result measured for UE 1 and a second measurement result measured for UE 2.

In FIG. 5, a bus architecture may include any quantity of interconnected buses and bridges. Specifically, various circuits of one or more processors represented by the processor 501 and a memory represented by the memory 503 are interconnected. The bus architecture may further link various other circuits such as a peripheral device, a voltage regulator, and a power management circuit. These are well known in the art, and therefore are not further described in this specification. The bus interface provides an interface. The transceiver 502 may be a plurality of components. To be specific, the transceiver 502 includes a transmitter and a receiver, and provides a unit configured to communicate with various other apparatuses on a transmission medium.

The processor 501 is responsible for bus architecture management and general processing. The memory 503 may store data used by the processor 501 when the processor 501 performs an operation.

The communications device provided in this embodiment of the present disclosure can perform the foregoing method embodiments. An implementation principle and a technical effect of the communications device are similar to those of the method embodiments, and details are not described again in this embodiment.

The method or algorithm steps described in combination with content disclosed in the present disclosure may be implemented by hardware, or may be implemented by a processor by executing software instructions. The software instruction may be formed by a corresponding software module. The software module may be stored in a RAM, a flash memory, a ROM, an EPROM, an EEPROM, a register, a hard disk, a removable hard disk, a read-only compact disc, or a storage medium of any other form known in the art. For example, a storage medium is coupled to the processor, so that the processor can read information from the storage medium or write information into the storage medium. Certainly, the storage medium may be a component of the processor. The processor and the storage medium may be located in the ASIC. In addition, the ASIC may be located in a core network interface device. Certainly, the processor and the storage medium may exist in the core network interface device as discrete components.

A person skilled in the art should be aware that in the foregoing one or more examples, functions described in the present disclosure may be implemented by hardware, software, firmware, or any combination thereof. When implemented by software, the foregoing functions may be stored in a computer readable medium or transmitted as one or more instructions or code in the computer readable medium. The computer readable medium includes a computer storage medium and a communications medium, where the communications medium includes any medium that enables a computer program to be transmitted from one place to another. The storage medium may be any usable medium accessible to a general-purpose or dedicated computer.

The objectives, technical solutions, and beneficial effects of the present disclosure are further described in detail in the foregoing specific implementations. It should be understood that the foregoing descriptions are merely specific implementations of the present disclosure, and are not intended to limit the protection scope of the present disclosure. Any modification, equivalent replacement, or improvement made on the basis of the technical solutions of the present disclosure shall fall within the protection scope of the present disclosure.

A person skilled in the art should understand that the embodiments of the present disclosure can be provided as a method, a system, or a computer program product. Therefore, the embodiments of the present disclosure may take the form of a hardware only embodiment, a software only embodiment, or an embodiment with both software and hardware. Moreover, the embodiments of the present disclosure may use a form of a computer program product that is implemented on one or more computer-usable storage media (including but are not limited to a magnetic disk memory, a CD-ROM, an optical memory, and the like) that include computer-usable program code.

The embodiments of the present disclosure are described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided to a processor of a general-purpose computer, a dedicated computer, an embedded processor, or another programmable data processing device to produce a machine, so that instructions executed by a processor of a computer or another programmable data processing device produce an apparatus for implementing a function specified in one or more processes of the flowchart and/or one or more blocks of the block diagram.

These computer program instructions may also be stored in a computer-readable memory that can instruct a computer or another programmable data processing device to work in a specific manner, so that an instruction stored in the computer-readable memory generates a product including an instruction apparatus, and the instruction apparatus implements a function specified in one or more processes of the flowchart and/or one or more blocks of the block diagram.

These computer program instructions may also be loaded onto a computer or another programmable data processing device, so that a series of operation steps are performed on the computer or the another programmable device to produce computer-implemented processing, thereby providing instructions executed on the computer or the another programmable device to implement the function specified in one or more processes of the flowchart and/or one or more blocks of the block diagram.

Obviously, a person skilled in the art can make various modifications and variations to the embodiments of the present disclosure without departing from the spirit and scope of the present disclosure. In this way, the present disclosure is intended to include these modifications and variations of the embodiments of the present disclosure provided that they fall within the scope of the claims of the present disclosure and their equivalent technologies.

What is claimed is that:

1. A measurement method, applied to a communications device, wherein the communications device comprises at least two user equipments (UEs), the at least two UEs comprise a first user equipment (UE 1) and a second user equipment (UE 2), and the method comprising:

receiving configuration information of minimization of drive-test (MDT) for the UE 1; and performing MDT measurement on the UE1 and the UE2 based on the configuration information of MDT for the UE1, and recording a first measurement result measured for a first network which is accessed by the UE 1 and a second measurement result measured for a second network which is accessed by the UE 2, wherein the first network and the second network have different network types;

wherein the configuration information of MDT for the UE 1 is obtained by the UE 2 from shared storage space within the communications device, or the configuration information of MDT for the UE 1 is transmitted between the UE 1 and the UE 2.

2. The method according to claim 1, wherein after the performing MDT measurement based on the configuration information, and recording a first measurement result measured for the first network and a second measurement result measured for second network, the method further comprises at least one of:

generating a first measurement report according to the first measurement result, and reporting at least part of the content of the first measurement report to a cell or network node of the UE 1; or generating a second measurement report according to the second measurement result, and reporting at least part of the content of the second measurement report to a cell or network node of the UE 2.

3. The method according to claim 2, wherein the reporting at least part of the content of the first measurement report to a cell or network node of the UE 1 comprises:

directly reporting at least part of the content of the first measurement report to the cell or network node of the UE 1.

4. The method according to claim 2, wherein the reporting at least part of the content of the first measurement report to a cell or network node of the UE 1 comprises;

sending first information to the cell or network node of the UE 1, wherein the first information is used to indicate the first measurement report;

receiving second information from the cell or network node of the UE 1, wherein the second information is used to instruct that at least part of the content of the first measurement report be reported; and sending at least part of the content of the first measurement report to the cell or network node of the UE 1 according to the second information.

5. The method according to claim 2, wherein the reporting at least part of the content of the second measurement report to a cell or network node of the UE 2 comprises:

directly reporting at least part of the content of the second measurement report to the cell or network node of the UE 2.

6. The method according to claim 2, wherein the reporting at least part of the content of the second measurement report to a cell or network node of the UE 2 comprises;

sending third information to the cell or network node of the UE 2, wherein the third information is used to indicate the second measurement report;

receiving fourth information from the cell or network node of the UE 2, wherein the fourth information is used to instruct that at least part of the content of the second measurement report be reported; and sending at least part of the content of the second measurement report to the cell or network node of the UE 2 according to the fourth information.

7. The method according to claim 1, wherein the configuration information comprises one or more of the following:

a parameter for indicating a measurement area;

to-be-recorded content of a measurement record; and to-be-recorded information about an abnormal event.

8. The method according to claim 7, wherein the parameter for indicating a measurement area indicates one or more of the following:

a network slice list;

a radio access network (RAN) paging area;

a RAN notification area;

a RAN location area;

a system message effective area; and information about a network cell.

9. The method according to claim 7, wherein the content of a measurement record comprises one or more of the following:

a reference signal received power (RSRP) value of a synchronization signal (SS) and PBCH block (Synchronization Signal and physical broadcast channel (PBCH) block, SS block);

a reference signal received quality (RSRQ) value of the SS block;

a signal to interference plus noise ratio (SINR) value of the SS block;

a measurement result of a primary synchronization signal (PSS) of the SS block;

a measurement result of a secondary synchronization signal (SSS) of the SS block;

a measurement result of a PBCH of the SS block;

an RSRP value of a channel state information reference signal (CSI-RS);

an RSRQ value of the CSI-RS;

an SINR value of the CSI-RS;

a measurement result of a tracking RS (TRS); and a measurement result of a phase-tracking RS (PTRS).

10. The method according to claim 9, wherein the measurement result of the PSS or the measurement result of the SSS comprises a beam time index.

11. The method according to claim 9, wherein the measurement result of the PBCH comprises one or more of the following:

a measurement result of a demodulation reference signal (DMRS); and beam information related to the DMRS.

12. The method according to claim 7, wherein the information about an abnormal event comprises one or more of the following:

radio link failure (RLF) information;

integrity protection failure (ICF) information; and abnormal event occurrence (AEO) information.

13. The method according to claim 12, wherein the AEO information comprises one or more of the following:

a type of the abnormal event;

identification information about a cell in which the abnormal event occurs;

information about a slice on which the abnormal event occurs;

a RAN notification area in which the abnormal event occurs;

a quantity of times the abnormal event occurs;

time when the abnormal event occurs;

duration of the abnormal event; and information about a radio bearer on which the abnormal event occurs.

14. The method according to claim 1, wherein the first measurement result or the second measurement result comprises one or more of the following: content of a measurement record and information about an abnormal event.

15. The method according to claim 1, wherein the UE 1 and the UE 2 share or exchange information of the communications device.

16. A communications device, comprising a processor, a memory, and a program stored in the memory and executable on the processor, wherein when the program is executed by the processor, the steps of a measurement method according to claim 1 are implemented, wherein the communications device comprises at least two user equipments (UEs), the at least two UEs comprise a first user equipment (UE 1) and a second user equipment (UE 2), and the method comprises:

receiving configuration information of minimization of drive-test (MDT) for the UE 1; and performing MDT measurement on the UE1 and the UE2 based on the configuration information of MDT for the UE1, and recording a first measurement result measured for the first network which is accessed by the UE 1 and a second measurement result measured for the second network which is accessed by the UE 2, wherein the first network and the second network have different network types;

wherein the configuration information of MDT for the UE 1 is obtained by the UE 2 from shared storage space within the communications device, or the configuration information of MDT for the UE 1 is transmitted between the UE 1 and the UE 2.

17. The communications device according to claim 16, wherein after the performing MDT measurement based on the configuration information, and recording a first measurement result measured for the first network and a second measurement result measured for the second network, the method further comprises:

generating a first measurement report according to the first measurement result, and reporting at least part of the content of the first measurement report to a cell or network node of the UE 1; and/or generating a second measurement report according to the second measurement result, and reporting at least part of the content of the second measurement report to a cell or network node of the UE 2.

18. The communications device according to claim 17, wherein the reporting at least part of the content of the first measurement report to a cell or network node of the UE 1 comprises:

directly reporting at least part of the content of the first measurement report to the cell or network node of the UE 1.

19. The communications device according to claim 17, wherein the reporting at least part of the content of the second measurement report to a cell or network node of the UE 2 comprises:

sending third information to the cell or network node of the UE 2, wherein the third information is used to indicate the second measurement report;

receiving fourth information from the cell or network node of the UE 2, wherein the fourth information is used to instruct that at least part of the content of the second measurement report be reported; and sending at least part of the content of the second measurement report to the cell or network node of the UE 2 according to the fourth information.

20. A non-transitory computer-readable storage medium, storing a computer program, wherein when the computer program is executed by a processor, steps of a measurement method are implemented, wherein the method comprises:

receiving configuration information of minimization of drive-test (MDT) for a first user equipment (UE 1); and performing MDT measurement on the UE1 and the UE2 based on the configuration information of MDT for the UE1, and recording a first measurement result measured for the first network which is accessed by the UE 1 and a second measurement result measured for a second network which is accessed by the UE 2, wherein the first network and the second network have different network types;

wherein a communications device comprises at least two user equipments (UEs), the at least two UEs comprise the first user equipment (UE 1) and the second user equipment (UE 2);

wherein the configuration information of MDT for the UE 1 is obtained by the UE 2 from shared storage space within the communications device, or the configuration information of MDT for the UE 1 is transmitted between the UE 1 and the UE 2.

* * * * *